# 2,979,516

Δ¹-ALLOPREGNEN-3,11,20-TRIONE AND INTERMEDIATES TO THE PRODUCTION THEREOF

Carl Djerassi, Birmingham, Mich., and George Rosenkranz, Mexico City, Mexico, assignors to Syntex S.A., Mexico City, Mexico, a corporation of Mexico No Drawing. Filed Mar. 21, 1957, Ser. No. 647,502
Claims priority, application Mexico Mar. 7, 1952
8 Claims. (Cl. 260—397.3)

The present invention relates to novel cyclopentanophenanthrene derivatives and to a method for the preparation thereof.

More particularly, the present invention relates to ring A unsaturated compounds of the pregnene and allopregnene series having an 11α-hydroxy group and 3- and 20-keto groups as well as to esters thereof.

In accordance with the present invention it has been discovered that allopregnan-11α-ol-3,20-dione and its esters may be converted into the novel Δ¹-allopregnen-11α-ol-3,20-dione and esters thereof and the corresponding Δ¹,⁴,¹⁶-alalogs. In accordance with the present invention, there has been further discovered that the aforementioned starting materials may be converted into certain novel bromo compounds as well as other certain novel intermediates for the production of the final compounds referred to.

The novel final products of the present novel process just referred to have therapeutic hormone activity, especially of the type characterizing the adrenal cortical steroids. Further since the 11α-hydroxy group may be readily oxidized to the 11-keto group with chromic acid, they are also intermediates for the production of the corresponding 11-keto unsaturated compounds. These compounds namely Δ¹-allopregnen-3,11,20-trione, and Δ¹,⁴,¹⁶-pregnatrien-3,11,20-trione have therapeutic activity of the type characterizing the cortical and progestational hormones. All of these compounds can be hydrogenated to the known compound allopregnan-3,11,20-trione (Fieser & Fieser, Natural Products Related to Phenanthrene, page 421).

The following equations serve to illustrate the present invention:

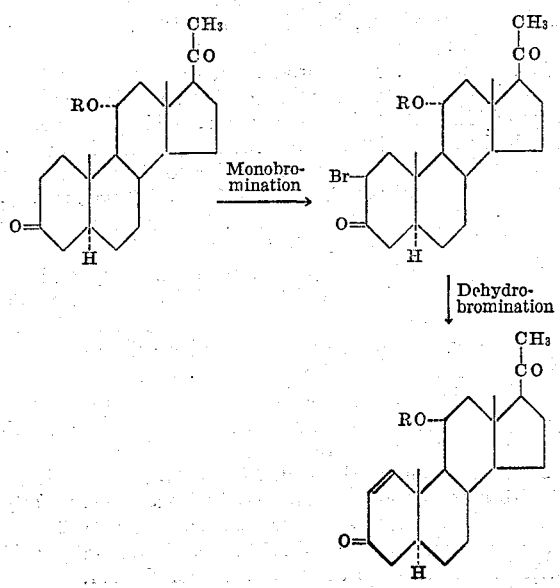

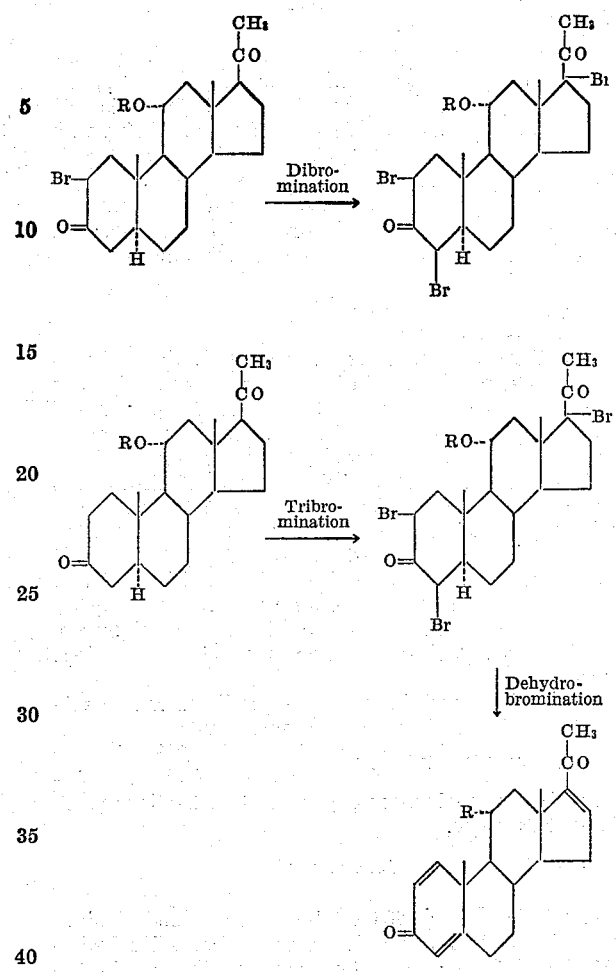

In the above equations, R preferably represents an acyl group, i.e., the residue of an organic acid conventionally used for the esterification of steroid alcohols. More particularly, R represents the residue of a lower fatty acid such as acetic or propionic or the residue of an aromatic acid such as benzoic. R may also represent hydrogen.

In practicing the process above outlined, an 11-monoester of allopragnan-11β-ol-3,20-dione, prepared in accordance with our United States application, Serial No. 338,145, filed February 20, 1953, now Patent No. 2,712,028, dissolved in a suitable solvent such as glacial acetic acid, is treated with either one or three molar equivalents of bromine in acetic acid in the presence of a catalytic amount of hydrogen bromide. If one molar equivalent of bromine is used the 2-bromo compound is formed, and if three molar equivalents, the 2,4,17-tribromo compound. Thereafter, these bromo derivatives are subjected to dehydrobromination by treatment with a dehydrobrominating agent, i.e., a tertiary amine, such as lutidine or collidine, or in the case of the 2-bromo compounds, by formation of the corresponding dinitrophenylhydrazone or semicarbazone which is thereafter subjected to cleavage with a suitable agent such as pyruvic acid. The tribromo compound may also be formed by treating the monobromo compound with two molar equivalents of bromine as indicated in the second equation. Thereafter conventional saponification gave the corresponding free compounds, i.e., Δ¹-allopregnen-11α-ol-3, 20-dione and Δ¹,⁴,¹⁶-pregnatrien-11α-ol-3,20-dione.

The following specific examples serve to illustrate, but are not intended to limit the present invention:

*Example I*

A solution of 1 g. of allopregnan-11α-ol-3,20-dione acetate in 60 cc. of acetic acid containing three drops of a 4-normal solution of hydrogen bromide in acetic acid was treated dropwise and under mechanical stirring with a solution of 1.05 molar equivalents of bromine in acetic acid. After the solution had completely decolorized, it was diluted with water and the precipitate was filtered, washed with water and air dried. The product was 2-bromo-allopregnan-11α-ol-3,20-dione acetate.

*Example II*

A solution of 1 g. of the 2-bromo derivative obtained according to Example I, in 7 cc. of gamma-collidine was refluxed for 45 minutes. The solution was cooled and the precipitate of collidine hydrobromide formed was filtered (its weight corresponded to 0.89 molar equivalent) and washed with ether. The filtrate was diluted with more ether and the solution was washed with dilute hydrochloric acid, sodium carbonate solution and water; dried over sodium sulphate and evaporated to dryness. In order to purify the product, it was dissolved in a mixture of benzene-hexane and passed through a column with 3 g. of ethyl acetate washed alumina. Recrystallization from ethyl acetate yielded $\Delta^1$-allopregnen-11α-ol-3,20-dione acetate.

In the above experiment, gamma-collidine can be substituted by 2,6-lutidine with the same results.

Refluxing the acetate for 1 hour with 1% ethanolic potassium hydroxide under atmosphere of nitrogen, followed by the usual work up, gave the free $\Delta^1$-allopregnen-11α-ol-3,20-dione.

*Example III*

A solution of 1 g. of the 2-bromo compound obtained according to Example I, 0.8 g. of semicarbazide hydrochloride and 0.9 g. of sodium acetate trihydrate in 150 cc. of glacial acetic acid was heated at 60° C. during 2 hours under atmosphere of nitrogen. After this time, 10 cc. of pyruvic acid, 3 g. of sodium acetate and 20 cc. of water were added and the mixture was heated 2 hours at 75° C. An additional amount (4 cc.) of pyruvic acid was added and the mixture was kept standing overnight. Next day it was diluted with much water and the precipitate was extracted with chloroform, washed with sodium bicarbonate and water, dried over sodium sulphate and evaporated to dryness, thus giving $\Delta^1$-allopregnen-11α-ol-3,20-dione acetate identical to the one obtained according to Example II.

*Example IV*

A solution of 2 g. of the 2-bromo derivative obtained according to Example I and 1.1 molar equivalents of 2,4-dinitrophenylhydrazine in 50 cc. of acetic acid was heated at 100° C. for 5 minutes, cooled and the crystalline orange dinitrophenylhydrazone formed was collected and washed with alcohol. 1 g. of this compound was dissolved in 50 cc. of chloroform and mixed with 75 cc. of 85% hydrochloric acid and 6 cc. of a 4-normal solution of hydrogen bromide in acetic acid. The mixture was heated at 60° C. for 3 hours under atmosphere of nitrogen and then diluted with chloroform. The chloroform solution was washed with sodium carbonate and water, dried over sodium sulphate and evaporated to dryness. After one crystallization from ethyl acetate the residue gave $\Delta^1$-allopregnen-11α-ol-3,20-dione acetate, identical to the one obtained according to Example II.

*Example V*

A solution of 2 g. of 2-bromo-allopregnan-11α-ol-3,20-dione acetate in acetic acid containing 5 drops of a 4-normal solution of hydrogen bromide in acetic acid, maintained at 25° C., was treated with a solution of 2 molar equivalents of bromine in acetic acid. After standing overnight, the solution was diluted with water and the precipitate formed was filtered, washed and recrystallized from chloroform to give 2,4,17-tribromo-allopregnan-11α-ol-3,20-dione acetate.

The same product was obtained by treating 2 g. of allopregnan-11α-ol-3,20-dione acetate, in solution in acetic acid containing 10 drops of a 4-normal solution of hydrogen bromide in acetic acid, with a solution of 3 molar equivalents of bromine in acetic acid and following the method described above.

*Example VI*

A solution of 2 g. of the tribromo derivative obtained according to Example V in 12 cc. of gamma-collidine was refluxed for 1 hour and after filtering the precipitate of collidine hydrobromide formed, the solution was diluted with ether and washed with dilute hydrochloric acid, sodium carbonate and water, dried over sodium sulphate and evaporated to dryness. The residue was dissolved in the necessary amount of hexane and passed through a column with 15 g. of ethyl acetate washed alumina. Recrystallization from acetone-hexane yielded $\Delta^{1,4,16}$-pregnatrien-11α-ol-3,20-dione. The same result was obtained when collidine was substituted by 2,6-lutidine.

Saponification with a 5% solution of potassium carbonate in 90% alcohol, refluxing during one hour, gave the free $\Delta^{1,4,16}$-pregnatrien-11α-ol-3,20-dione.

*Example VII*

100 mg. of either the $\Delta^{1,4,16}$-pregnatrien-11α-ol-3,20-dione of Example VI or $\Delta^1$-allopregnen-11α-ol-3,20-dione of Example II in 3 cc. of purified acetic acid was cooled to 14° C. and then treated with a solution of 20 mg. of chlorimum trioxide (slightly over one molar equivalent of active oxygen) in 8 cc. of purified acetic acid which was added after previously cooling to 14° C. The mixture was kept standing for 5 minutes and then poured into 200 cc. of 5% sodium bisulphate solution, extracted with chloroform and then the chloroform extract was evaporated to dryness. The residue was then purified by chromatography to give either $\Delta^{1,4,16}$-pregnatrien-3,11,20-trione or $\Delta^1$-allopregnen-3,11,20-trione depending on the respective starting material.

The present application is a continuation-in-part of application Serial No. 340,899, filed March 6, 1953, now Patent No. 2,788,353, issued April 9, 1957.

We claim:

1. A process for the production of a compound selected from the class consisting of 2,4,17-tribromo-allopregnan-11α-ol-3,20-dione lower fatty acid esters thereof and the benzoic acid ester thereof which comprises treating a corresponding compound selected from the class consisting of 2-bromo-allopregnan-11α-ol-3,20-dione lower fatty acid esters thereof and the benzoic acid ester thereof with two molar equivalents of bromine.

2. A process for the production of a compound selected from the class consisting of 2,4,17-tribromo-allopregnan-11α-ol-3,20-dione lower fatty acid esters thereof and the benzoic acid ester thereof which comprises treating a corresponding compound selected from the class consisting of allopregnan-11α-ol-3,20-dione lower fatty acid esters thereof and the benzoic acid ester thereof with three molar equivalents of bromine.

3. A new compound selected from the class consisting of 2-bromo-allopregnan-11α-ol-3,20-dione lower fatty acid esters thereof, the benzoic acid esters thereof, 2,4,17-tribromo-allopregnan-11α-ol-3,20-dione lower fatty acid esters thereof and the benzoic acid ester thereof.

4. 2-bromo-allopregnan-11α-ol-3,20-dione.
5. 2-bromo-allopregnan-11α-ol-3,20-dione acetate.
6. 2,4,17-tribromo-allopregnan-11α-ol-3,20-dione.
7. 2,4,17-tribromo-allopregnan-11α-ol-3,20-dione acetate.
8. Δ¹-allopregnen-3,11,20-trione.

References Cited in the file of this patent

UNITED STATES PATENTS

| | | |
|---|---|---|
| 2,788,353 | Djerassi | Apr. 9, 1957 |
| 2,874,172 | Herzog et al. | Feb. 17, 1959 |
| 2,913,457 | Fonken et al. | Nov. 17, 1959 |